(12) United States Patent
Hurd

(10) Patent No.: US 10,795,351 B2
(45) Date of Patent: Oct. 6, 2020

(54) SYSTEM AND METHOD FOR AUTONOMOUS CONTROL OF AGRICULTURAL MACHINERY AND EQUIPMENT

(71) Applicant: Raven Industries, Inc., Sioux Falls, SD (US)

(72) Inventor: Colin Josh Hurd, Ames, IA (US)

(73) Assignee: Raven Industries, Inc., Sioux Falls, SD (US)

( * ) Notice: Subject to any disclaimer, the term of this patent is extended or adjusted under 35 U.S.C. 154(b) by 0 days.

(21) Appl. No.: 15/653,175

(22) Filed: Jul. 18, 2017

(65) Prior Publication Data

US 2018/0024549 A1    Jan. 25, 2018

Related U.S. Application Data

(60) Provisional application No. 62/364,091, filed on Jul. 19, 2016.

(51) Int. Cl.
| | |
|---|---|
| *G05D 1/00* | (2006.01) |
| *G05D 1/02* | (2020.01) |
| *A01B 69/04* | (2006.01) |
| *H04W 4/021* | (2018.01) |
| *H04W 4/40* | (2018.01) |
| *H04W 4/50* | (2018.01) |
| *A01B 79/00* | (2006.01) |
| *H04W 84/18* | (2009.01) |
| *H04L 29/08* | (2006.01) |

(52) U.S. Cl.
CPC ......... *G05D 1/0022* (2013.01); *A01B 69/008* (2013.01); *G05D 1/0016* (2013.01); *G05D 1/0027* (2013.01); *G05D 1/0044* (2013.01); *G05D 1/0088* (2013.01); *G05D 1/0274* (2013.01); *H04W 4/021* (2013.01); *H04W 4/40* (2018.02); *H04W 4/50* (2018.02); *A01B 79/005* (2013.01); *G05D 2201/0201* (2013.01); *H04L 67/12* (2013.01); *H04W 84/18* (2013.01)

(58) Field of Classification Search
CPC ........ H04W 4/021; H04W 4/40; H04W 4/50; H04W 84/18; G05D 1/0016; G05D 1/0022; G05D 1/0027; G05D 1/0044; G05D 1/0088; G05D 1/0274; G05D 2201/0201; H04L 67/12; A01B 69/008; A01B 79/005
USPC ........................................................... 701/2
See application file for complete search history.

(56) References Cited

U.S. PATENT DOCUMENTS

| | | | | |
|---|---|---|---|---|
| 9,288,938 | B2* | 3/2016 | Cavender-Bares | ......................... A01C 21/002 |
| 9,392,743 | B2* | 7/2016 | Camacho-Cook | ... A01B 69/008 |
| 9,408,342 | B2* | 8/2016 | Lindores | .............. A01B 79/005 |
| 9,877,470 | B2* | 1/2018 | Crinklaw | .............. B05B 12/122 |
| 9,974,222 | B2* | 5/2018 | Laurichesse | ......... A01B 69/008 |
| 10,096,073 | B2* | 10/2018 | Groeneveld | ........... A01G 22/00 |

(Continued)

*Primary Examiner* — Atul Trivedi
(74) *Attorney, Agent, or Firm* — Schwegman Lundberg & Woessner, P.A.

(57) ABSTRACT

A system and method of controlling agriculture equipment which combines geographical coordinates, machine settings, machine position, path plans, user input, and equipment parameters to generate executable commands based of a variety of different in-field agricultural operation objectives for a vehicle equipped with an automatic or electronically controlled locomotion systems capable of reading and executing the commands.

26 Claims, 9 Drawing Sheets

(56) References Cited

U.S. PATENT DOCUMENTS

| | | | |
|---|---|---|---|
| 10,115,158 B2* | 10/2018 | Lindores | A01B 79/005 |
| 10,149,468 B2* | 12/2018 | Crinklaw | A01M 7/0014 |
| 10,255,670 B1* | 4/2019 | Wu | H04N 5/2252 |
| 2015/0278966 A1* | 10/2015 | Johnson | G06Q 50/02 |
| | | | 702/2 |
| 2016/0057920 A1* | 3/2016 | Spiller | A01B 69/008 |
| | | | 701/23 |
| 2016/0129917 A1* | 5/2016 | Gariepy | G05D 1/0011 |
| | | | 701/2 |
| 2016/0147225 A1* | 5/2016 | Sights | G05D 1/0088 |
| | | | 701/23 |
| 2016/0180473 A1* | 6/2016 | Groeneveld | A01G 22/00 |
| | | | 705/7.25 |
| 2016/0334276 A1* | 11/2016 | Pluvinage | G01J 3/2823 |
| 2017/0075034 A1* | 3/2017 | Kleeman | G01W 1/10 |
| 2017/0168157 A1* | 6/2017 | Hagerman | G01S 13/958 |
| 2017/0270446 A1* | 9/2017 | Starr | G06Q 10/06313 |
| 2017/0270624 A1* | 9/2017 | Rooney | E21B 41/00 |
| 2017/0329339 A1* | 11/2017 | Gordon | G06Q 50/00 |
| 2017/0351005 A1* | 12/2017 | Alvarez | G01W 1/10 |
| 2018/0024549 A1* | 1/2018 | Hurd | G05D 1/0016 |
| | | | 701/2 |
| 2018/0339712 A1* | 11/2018 | Kislovskiy | H04W 4/021 |
| 2018/0341261 A1* | 11/2018 | Kislovskiy | G01C 21/3438 |
| 2019/0075724 A1* | 3/2019 | Becke | A01D 34/78 |
| 2019/0106020 A1* | 4/2019 | Qi | B60N 2/0276 |
| 2019/0150357 A1* | 5/2019 | Wu | A01C 21/00 |
| 2019/0200519 A1* | 7/2019 | Chrysanthakopoulos | |
| | | | A01D 34/008 |
| 2019/0353767 A1* | 11/2019 | Eberspach | G01J 1/0422 |

* cited by examiner

SYSTEM AND METHOD FOR AUTONOMOUS CONTROL OF AGRICULTURAL MACHINERY AND EQUIPMENT

CROSS REFERENCE TO RELATED APPLICATIONS

This application claims priority to U.S. Provisional Application No. 62/364,091 which was filed on Jul. 19, 2017.

BACKGROUND

The field of this disclosure is related to control and monitoring systems for autonomous agricultural vehicles and machinery.

In an effort to achieve greater efficiency it is becoming more important to turn over monotonous tasks, such as operating machinery in the field to computers. While much effort has been directed towards decreasing the responsibilities of machinery operators while in the cab, no system offers operators the ability to easily monitor and control machinery capable of full autonomy, used for a variety of tasks, remotely over the internet and/or wirelessly. Allowing operators to monitor and control autonomous equipment over the internet and/or through a remote terminal is very desirable due to the cost savings and efficiencies that can be gained. Giving a farmer or operator the ability to have complete oversight of autonomous machinery will allow them to focus on other tasks instead of sitting in the cab of a machine. Furthermore, it is desirable to remove the operator from the hazards which are associated with many agricultural tasks, such as applying harmful pesticides or fertilizers. All those with an understanding of agriculture agree that there are tremendous advantages to autonomous machinery however, to-date it has been challenging for manufactures to achieve full autonomy of agricultural equipment and machinery largely due to the unique challenges faced by agricultural equipment and machinery and a lack of control methods and systems specifically directed to the needs of the agriculture industry.

This disclosure allows machine operators the ability to control the speed, steering, turning radius, travel routes, operating area, staging locations, turning patterns, engine speed, hitch, sensors, and a variety of other settings while simultaneously monitoring an agriculture machine from any location via an internet connection and/or wireless link. Furthermore, the system presented herein serves as virtual command center which allows users to define settings and tasks for equipment and sensors connected to machinery. The system presented herein functions as a hosting and communication platform which allows users' connected machines and sensors to receive and send data through application process interfaces (APIs) to a shared internet server.

Currently the only systems which allows for remote control of autonomous machinery require programming expertise to operate or they do not provide much if any of the features required to operate and control agriculture machinery across a variety of applications. This disclosure offers a substantial improvement over existing technology because it serves as a hosting platform for machinery and data while allowing users to set up any number of fields, machinery, equipment and operations then generate executable processes which an autonomous machine can follow.

Currently, the only way for users to simultaneously configure, control and monitor their equipment remotely is through machine to machine communication systems which do not allow full control of machinery and require human operators to be physically located in the machine. Additionally, users are restricted by what types of devices they can use to connect to and control other machines and have limited mobility due to short range wireless connections and lack of internet connectivity. By allowing the connection of any compatible device via the internet and connecting it to autonomous machinery the system presented herein gives users an easy and seamlessly way to configure, control, monitor and access data from their equipment while gaining a great deal of efficiency when conducting field operations.

Other methods require the human operators to still physically remain on the machine to configure and control it and require expensive systems which do not provide the value of freeing an operator to complete other tasks and do not allow remote access through any internet connected device.

The system presented in this disclosure uses devices connected to a server via the internet to send and receive data, configure operational settings, design operations and define geographical areas of operation which can be used to control systems onboard the machine that enable the electronic control of speed, steering and other components giving users the ability to have complete oversight and control of unmanned systems.

BRIEF SUMMARY OF THE DISCLOSURE

The system presented in this disclosure includes a method of setting up fields and operations while configuring and controlling agricultural machinery with a variety of devices through an online server or through an offline local mesh network both of which have a direct link to machinery which is capable of being controlled electronically. The system allows users to communicate directly to and coordinate the operation of multiple manned or unmanned machines simultaneously. The system takes user inputs, or pre-configured data to create geographical field maps, machine and equipment settings and operation protocols then converts them into commands which can be used by the machine's controller to control all core aspects of mobility and operation remotely. Furthermore, the system gathers data from multiple machine controllers and other attached sensors which it uses to display relevant information, such as position, on a graphical user interface to the user while also using the data to make calculations which can be turned into commands to assist in the navigation or operation of the machine in real time. Lastly, the disclosure provides users with tools to define boundaries of operation, path plans based on the geographical area of use and operation protocols based on the field task to be done.

DETAILED DESCRIPTION AND BEST MODE OF IMPLEMENTATION

Figure 1:
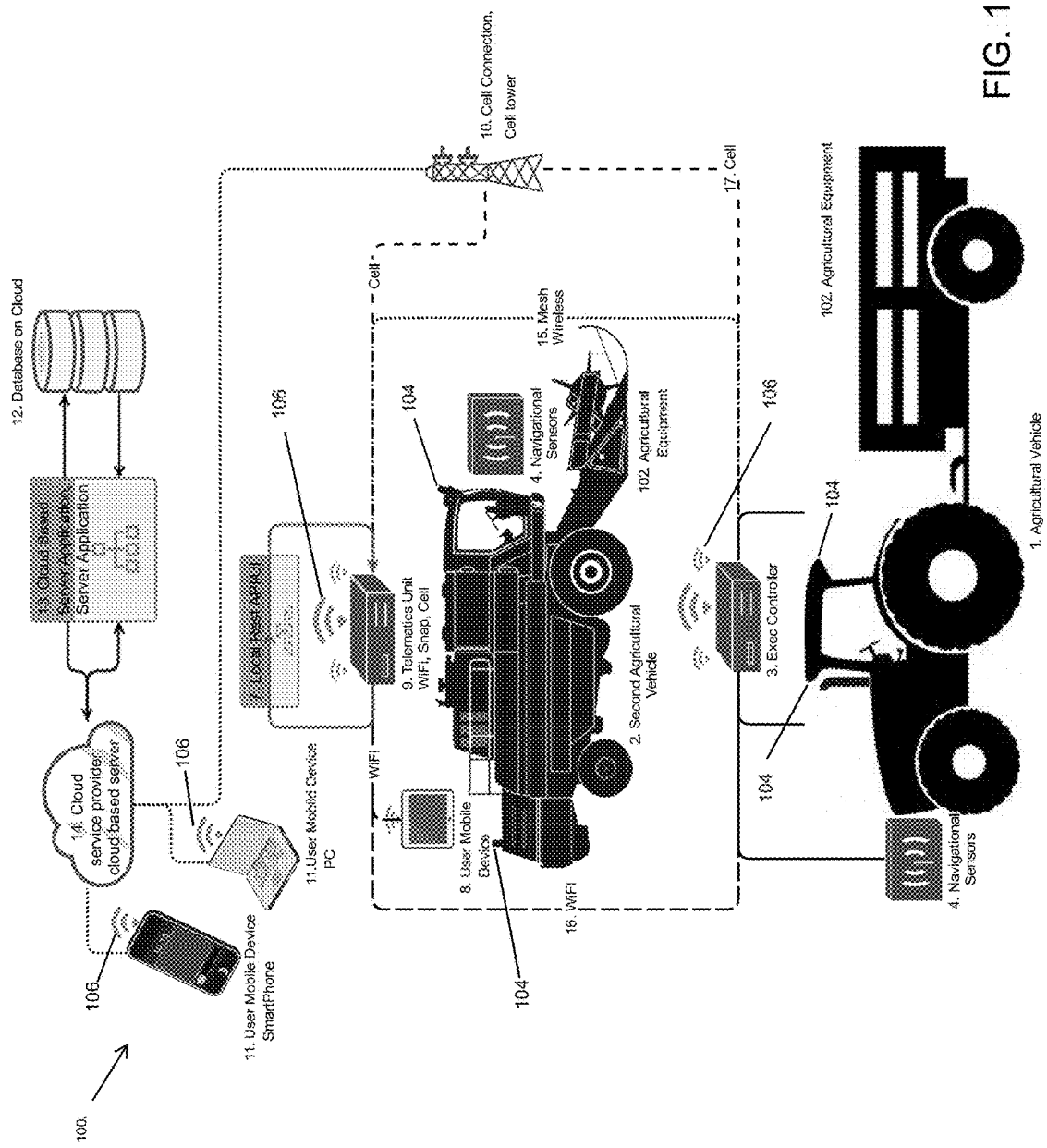
FIG. 1. is a plan view of the system, the view showing an example of a system for controlling an autonomously controlled first agricultural vehicle and second agricultural vehicle using a cloud based server application, in this example the first agricultural vehicle is a tractor with an attached agricultural equipment which is a wagon, in this example the second agricultural vehicle is a combine with an attached agricultural equipment which is a harvester head, in this example, the first and second agricultural vehicles have attached navigational sensors which provide location data such a NEMA strings, heading, yaw, pitch, roll, latitude and longitude, altitude speed, and other position related data to an, operably attached, integrated central processor configured with telemetry which includes a wireless communications module that facilitates communication on a number of channels or frequencies and with a number of wireless protocols to provide redundancy and durability in areas that present a wireless communication challenges, and may include a cellular modem, a Wi-Fi modem and any number of radios which may operate on various frequencies. This central processor and telemetry which may be referred to as simply computers, controllers, central computers, central controllers or the like is operably connected to, navigational sensors, electronic steering controllers, electronic speed controllers, user mobile devices, vehicle telematics units, and any other electronic attachment needed to facilitate autonomous control of the first and second agricultural vehicle, the view shows the first and second agricultural vehicles wirelessly connected through a local mesh network, a local Wi-Fi connection and/or a cellular signal to a cloud based service provider, a cloud based server application and a cloud based database, the view also showing user mobile devices wirelessly connected to the cloud based service provider, the cloud based server application, the cloud based database and the first and second agricultural vehicles through which the user can control the first and second agricultural vehicles as well as control the system in general.
Figure 2:
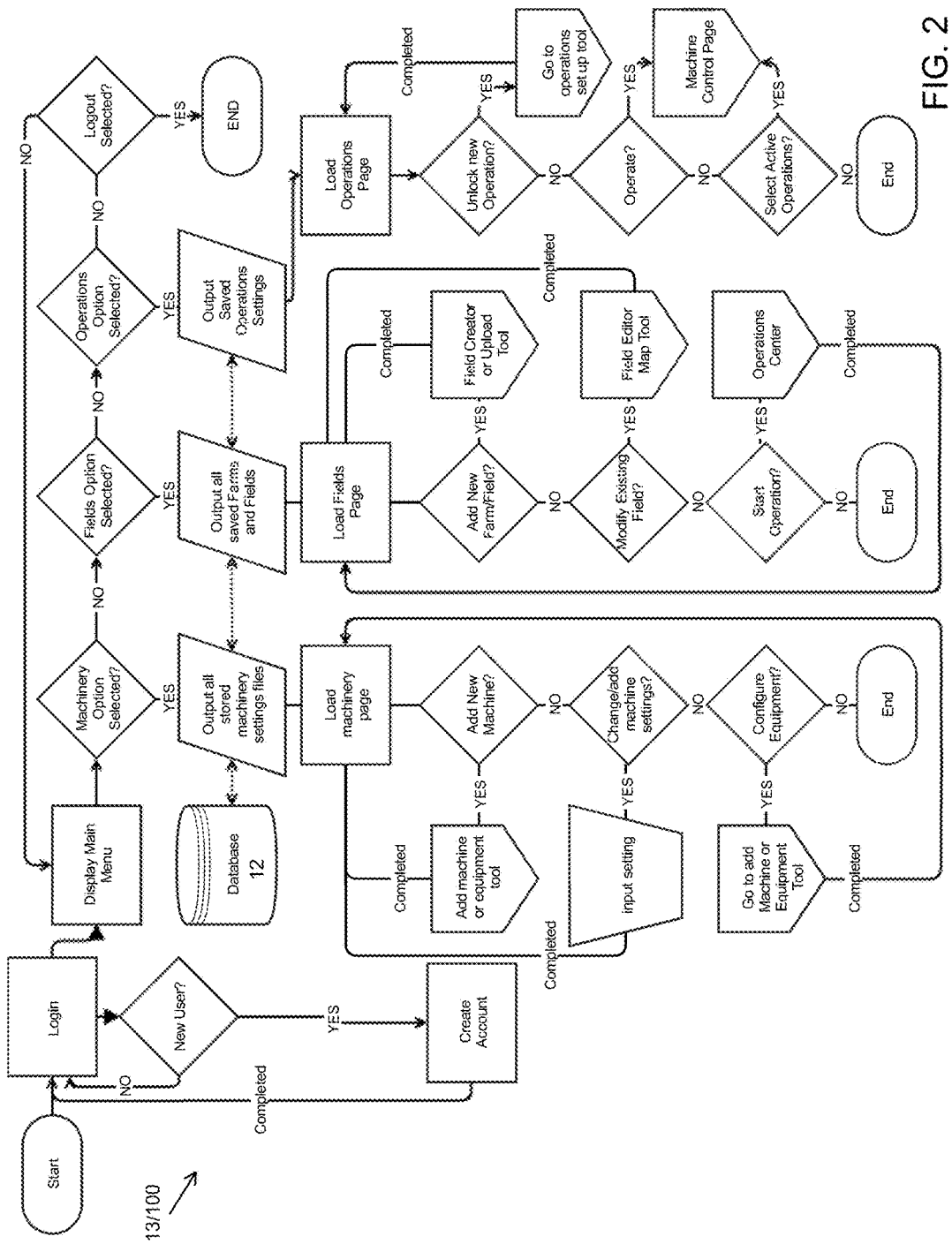
FIG. 2. is a plan view of a flowchart of one example of use of the system presented herein, the view showing a flowchart of one manner of operation of the agricultural operation and control application presented herein, the view showing a flowchart as to how to set up agricultural vehicles (machines), agricultural equipment, agricultural fields, agricultural operations, among other settings in the agricultural operation and control application presented herein.
Figure 3:
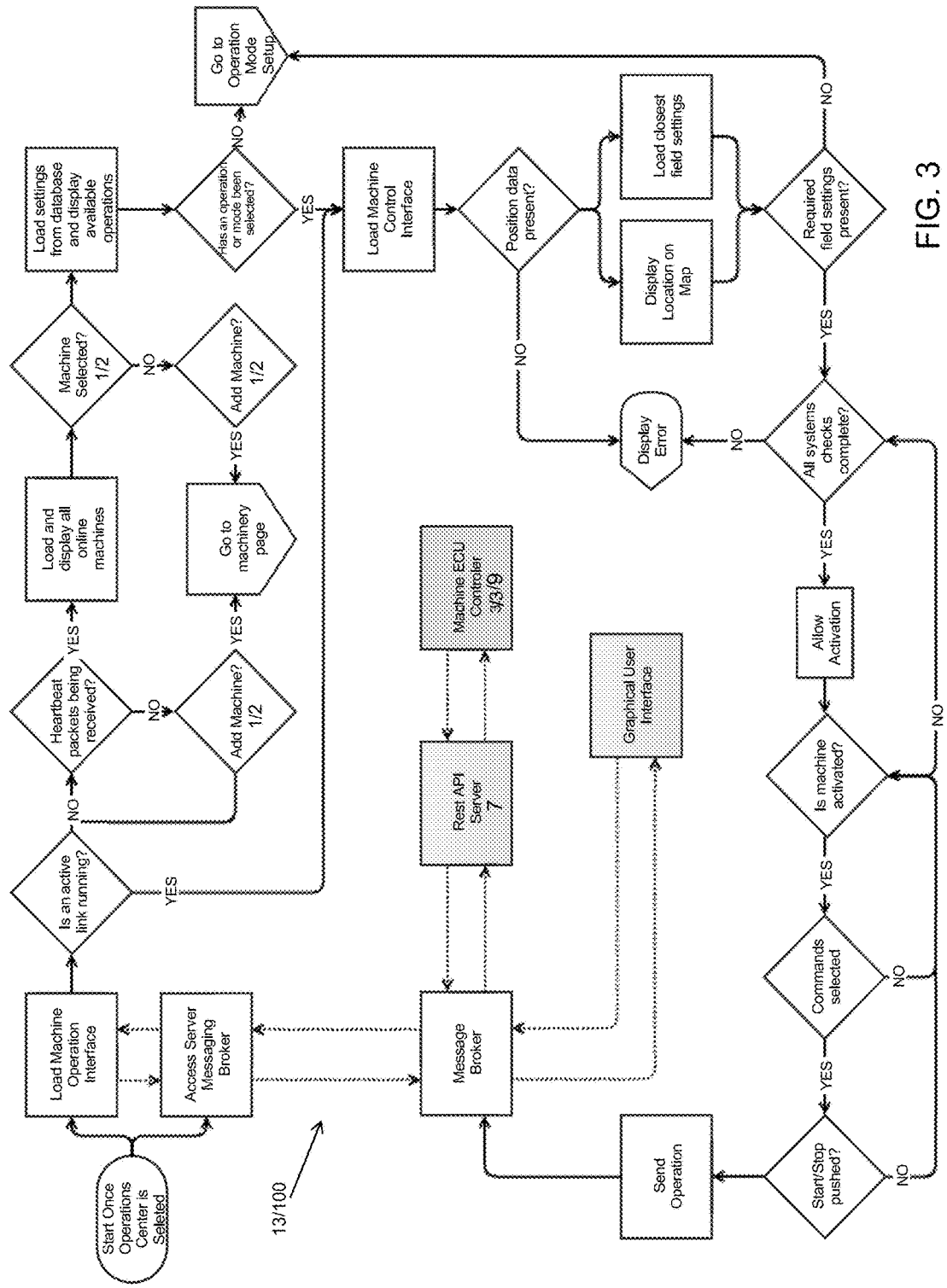
FIG. 3. is a plan view of a flowchart of one example of use of the system presented herein, the view showing a flowchart of one manner of operation of the agricultural operation and control application presented herein, the view showing a flowchart as to how the agricultural operation and control application presented herein operates.
Figure 4:
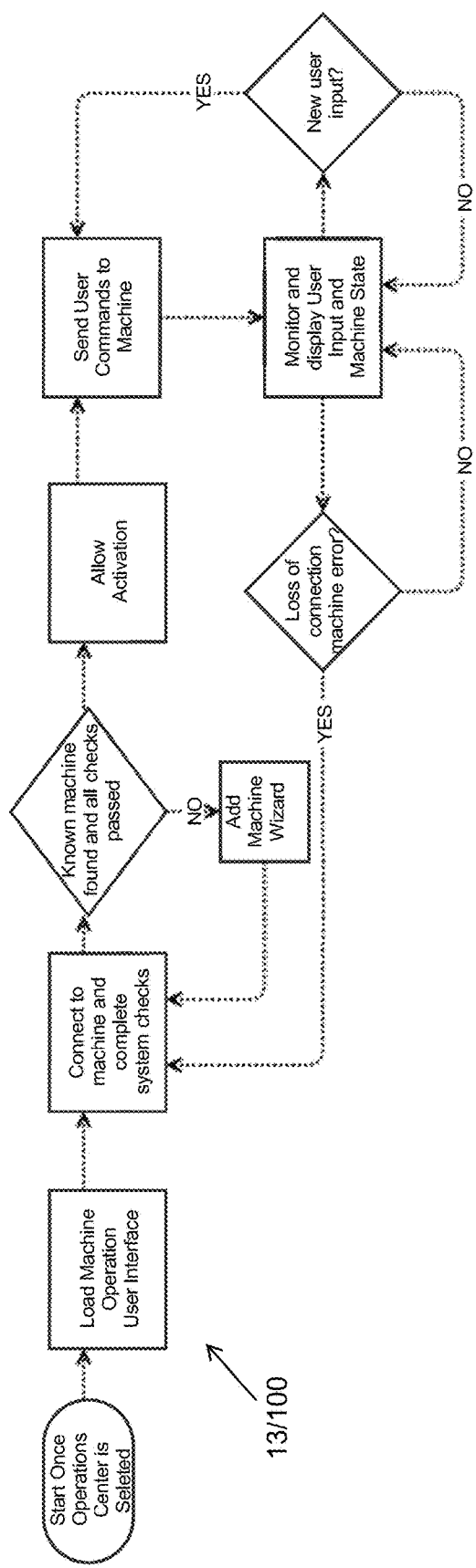
FIG. 4. is a plan view of a flowchart of one example of use of the system presented herein, the view showing a flowchart of one manner of operation of the agricultural operation and control application presented herein, the view showing a flowchart as to how the agricultural operation and control application presented herein operates.
Figure 5:
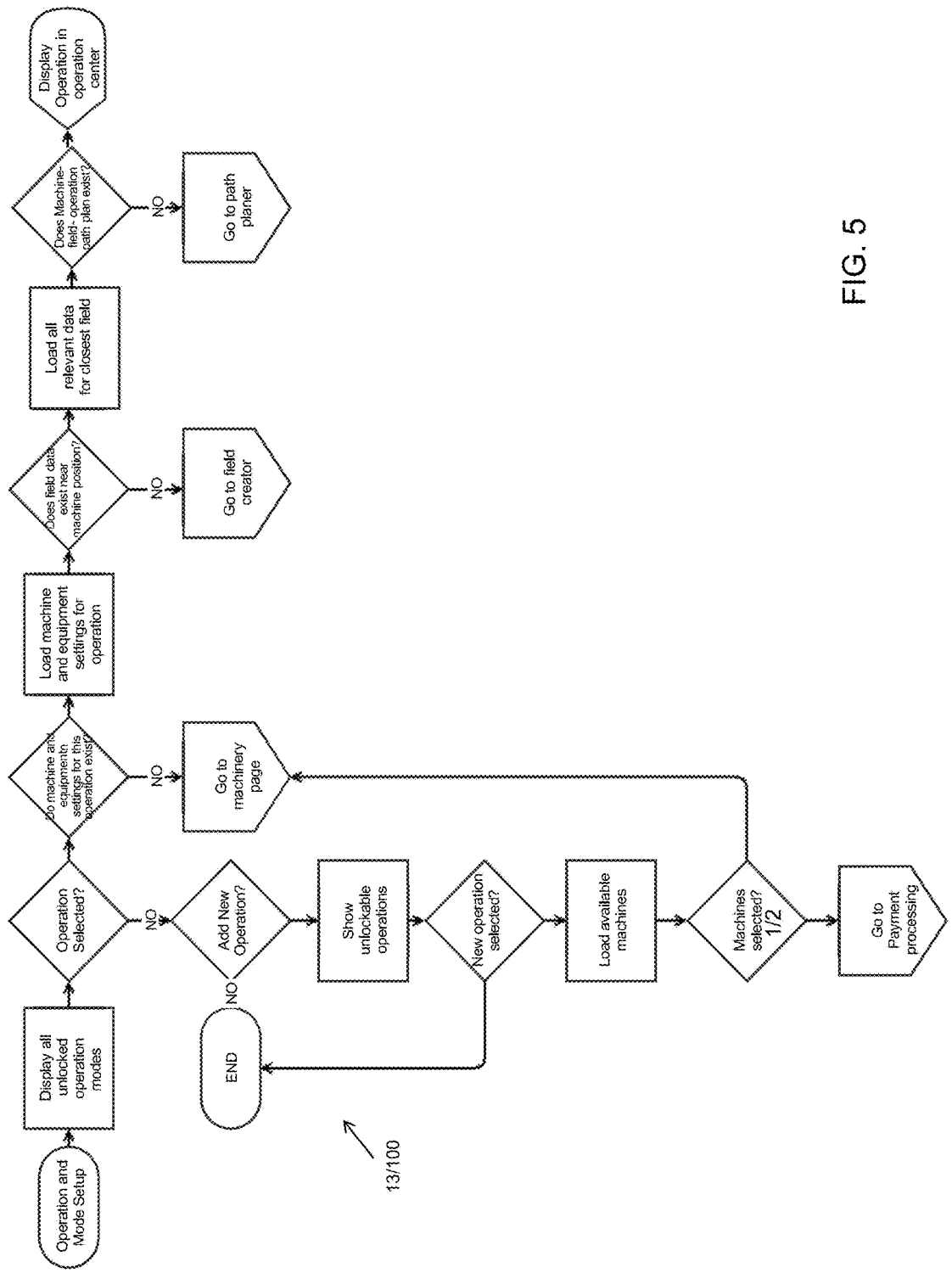
FIG. 5. is a plan view of a flowchart of one example of use of the system presented herein, the view showing a flowchart of one manner of operation and setup of the agricultural operation and control application presented herein, the view showing a flowchart as to how the agricultural operation and control application presented herein operates.
Figure 6:
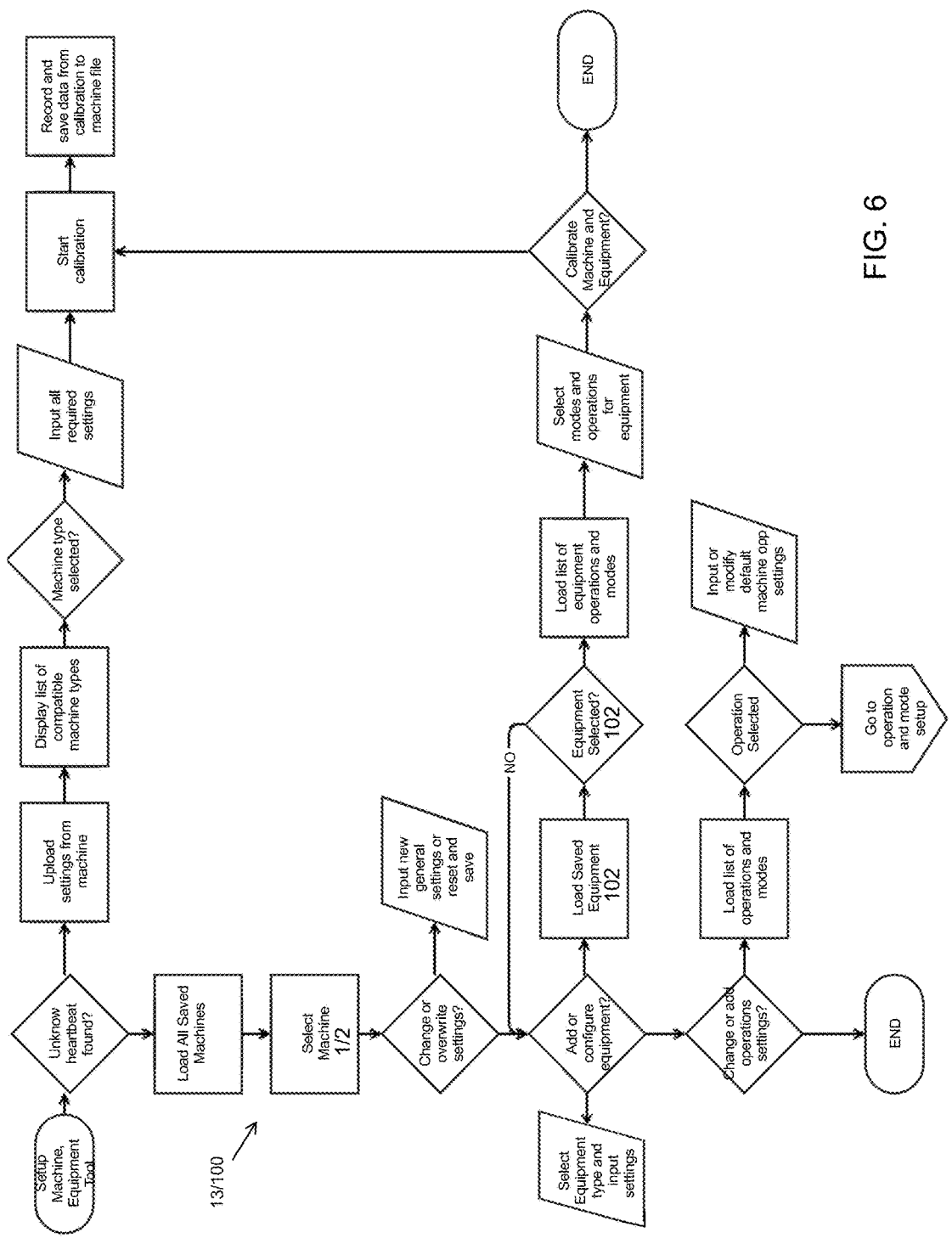
FIG. 6. is a plan view of a flowchart of one example of use of the system presented herein, the view showing a flowchart of one manner of operation and setup of the agricultural operation and control application presented herein, the view showing a flowchart as to how to setup an agricultural vehicle (machine) and agricultural equipment in the agricultural operation and control application presented herein.
Figure 7:
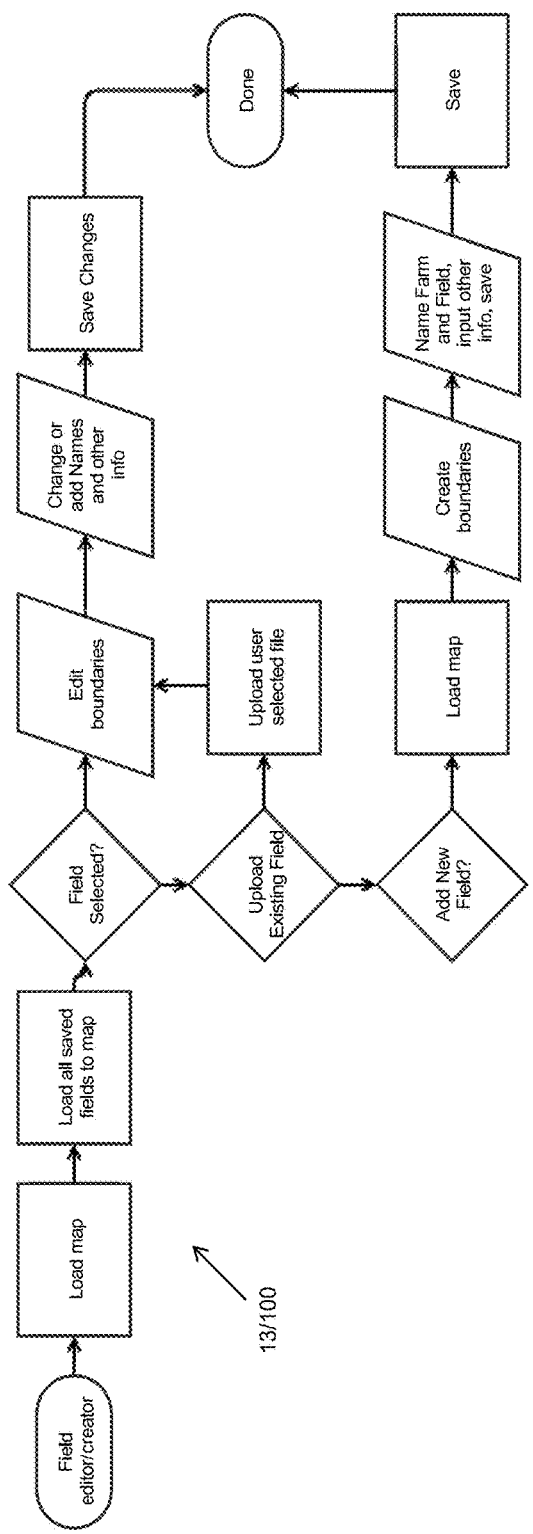
FIG. 7. is a plan view of a flowchart of one example of use of the system presented herein, the view showing a flowchart of one manner of operation and setup of the agricultural operation and control application presented herein, the view showing a flowchart as to how to setup an agricultural field in the agricultural operation and control application presented herein.
Figure 8:
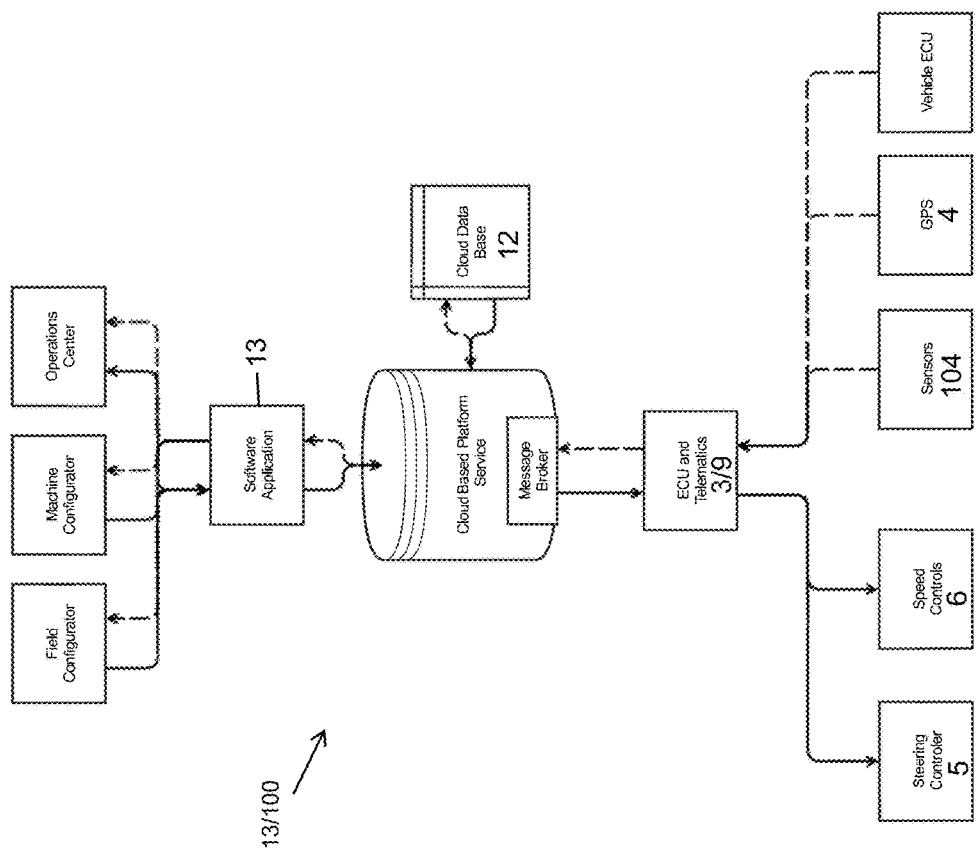
FIG. 8. is a plan view of a flowchart of one example of use of the system presented herein, the view showing a flowchart of one manner of operation of the agricultural operation and control application presented herein, the view showing a flowchart as to how the components of the system are connected and how information flows through the agricultural operation and control application presented herein.

With reference to the figures, a system 100 is presented for use with a first agricultural vehicle (1). First agricultural vehicle (1) is formed of any suitable size, shape, design and configuration and is configured to perform primarily agricultural processes such as, for non-limiting examples, planting, harvesting, plowing, spraying, cultivation, tillage, fieldwork, spreading, or any other agricultural process or the like. Examples of agricultural vehicles (1) include tractors, trucks, spreaders, sprayers, combines, utility vehicles, or any other vehicle.

In one arrangement, as is shown, first agriculture vehicle (1) is a tractor that is configured with or already has electronic sub-controllers for controlling speed (6) and steering (5), also known as electronic speed control system (6) or ESpC (6) and electronic steering control system (5) or ESC (5). The these sub-controllers (5 & 6) are connected to an integrated executive controller unit and telemetry controller (3) also known as ECU and telemetry controller (3), executive controller (3), or ECU (3) or central controller (3) for short which is equipped with or connected to at least one processor, navigational programs.

Executive controller (3) is formed of any suitable size, shape and design and essentially facilitates the also includes or is connected to a wireless communications module (106) which facilitates wireless communications as Wi-Fi, cellular, mesh and/or radio transmitters and/or receivers that facilitates wireless communication. The ECU (3) is connected to navigational sensors (4) which may include, GPS, RTK, IMUS Cameras, Lidar, Radar, and any other positioning sensors (104). Additional sensors (104) may be installed on the agricultural vehicle (1, 2) the help detect obstacles, people, other vehicles and the like such as proximity sensors, cameras, radar, sonar, and collision sensors, and the like.

The system 100 includes a second agricultural vehicle (2). Like the first agricultural vehicle (1), second agricultural vehicle (2) is formed of any suitable size, shape, design and configuration and is configured to perform primarily agricultural processes such as, for non-limiting examples, planting, harvesting, plowing, spraying, cultivation, tillage, fieldwork, spreading, or any other agricultural process or the like. Examples of agricultural vehicles (2) include tractors, trucks, spreaders, sprayers, combines, utility vehicles, or any other vehicle. In addition, second agricultural vehicle (2) is configured to work in association with the first agricultural vehicle (1) in a co-laboring manner. As an example, as is shown in FIG. 1, the first agricultural vehicle (1) is a tractor with an attached wagon as the agricultural equipment (102) and the second agricultural vehicle (2) is a combine with an attached harvesting head as the agricultural equipment (102). In this example, the first agricultural vehicle (1) and first agricultural equipment (102), which is a tractor with an attached wagon, is configured to work in-cooperation with the second agricultural vehicle (2) and second agricultural equipment (102), which is a combine and harvesting head.

Second agricultural vehicle (2), or any number of additional vehicles, are configured with a vehicle telematics unit (9) (which may be similar to or identical to the integrated executive controller unit and telemetry controller (3)) which also includes wireless connectivity, and a local user interface (7) and API programs (application program interface). In one arrangement, the vehicle telematics unit (9) and integrated tractor executive controller unit and telemetry controller (3) are configured to establish a connection with a cloud based server application (13) through a cloud service provider (14). The cloud based server application (13) is operationally connected to a cloud based database (12).

As one example, one method of connection to the cloud based server (13) is through cellular service (17) provided by a cellular service provider (10). As another example, a second method of connection to the cloud based server (13) is through the vehicle telematics unit (9) and/or integrated tractor executive controller unit and telemetry controller (3) and/or user mobile device (11) acting as a local Wi-Fi connection (16) or local mesh network (15) gateway connected to the internet.

A user mobile device (8) connected via local Wi-Fi connection (16) to the vehicle telematics unit (9) can display a local (non-internet based) local user interface (7) which when connected to first agricultural vehicle (1) and/or second agricultural vehicle (2) will allow for direct machine to machine connectivity and control through local Wi-Fi connection (16) and/or local mesh network (17) independently of an internet connection to the cloud based server application (13).

With user mobile device (11), which is wirelessly connected to the internet, users are able to connect via the cloud service provider (14) to the cloud based server application (13) and cloud based database (12). The cloud based server application (13) displays an interactive user interface on a user mobile device (11) such as a smart phone, tablet, laptop or any other device, which allows users to monitor and control the connected first agricultural vehicle (1), second agricultural vehicle (2) and any other vehicle as well as their associated agricultural equipment (102). Such a user interface may be rendered through an app which is designed for a devices operating system or through a browser window which forms a client sever relationship with the cloud based application server. The cloud application server may be any type of software server configured to write to or request information for a database while graphically displaying information though a user app or browser window. Alternatively a user can access a local based user interface (7) with a locally connected user mobile device (8) which allows the user to monitor and control any number of locally connected vehicles though a local server client relationship whereas a local server similar to the cloud based server may be running on any number of the machine ECU's such as first agricultural vehicle (1) and second agricultural vehicle (2) within a local Wi-Fi connection (16) or local mesh network of a user device (15).

Agricultural equipment (102) is connected to first agricultural vehicle (1) and second agricultural vehicle (2) as well as any other agricultural vehicles that are part of the system (100). Agricultural equipment (102) is any attachment to agricultural vehicle (1, 2) such as a grain wagon, a grain cart, an auger wagon, a shredder, a harvester head, a bailer, a mower, tillage equipment, a plow, a blade, a snow blower, a sprayer or sprayer boom, a chopper, a ripper, a planter, a feed wagon, a spreader, a windrower, a trailer, or any other agricultural equipment or the like or any combination thereof.

Once an agricultural vehicle (1, 2) has established a wireless connection which can be accomplished through making a request on startup through a local broker which handles message and broadcast them over multiple wireless channels through the telematics controllers, s the user conducts several actions to effectively use the agricultural vehicle (1, 2) and agricultural equipment (102) to complete a desired agricultural operation. Some settings must be initially input and saved through the user interface, these settings can be changed, but the user does not have to input them again for any given agricultural operation, agricultural field, piece of agricultural equipment (102) or machine.

Upon the initial connection the system (100) to an agricultural vehicle (1, 2) the user is asked to select from a list of agricultural vehicle or machine types and/or manually input values such as, length, width, turn radius, acceleration rates, top speed, GPS sensor location and sensor locations, among any other pertinent information. After the initial values have been defined the user completes a calibration protocol which requires a variety of actions to be conducted manually where agricultural vehicle (1, 2) limits can be measured by the ECU and then saved. Once the agricultural vehicle (1, 2) has been set up and configured in the system (100) the user can also add agricultural equipment (102) (such as a tillage tool, mower, grain cart or the like for example) and configure it for the agricultural vehicle (1, 2) and for use with the agricultural vehicle (1, 2). These settings are saved and automatically loaded each time the agricultural vehicle (1, 2) and associated agricultural equipment (102) is used after the initial setup.

Additionally, for the agricultural vehicle (1, 2) and associated agricultural equipment (102) to complete a task autonomously the user also needs to set up agricultural fields and agricultural operations. These primary settings only need to be defined once for any given agricultural field or agricultural operation but are easily changed or adjusted when desired.

To set up an agricultural field, a user uploads shape files or other coordinate based polygon files to form geographical boundaries or draws them using the field creator tool with a mapping function that allows polygons to be drawn on a digital map interface then saved as a field. To perform an agricultural operation the user selects a saved agricultural field and defines an agricultural operation type from a saved set of different operations. The user may also select or suggest traffic areas or patterns, defines turning areas, and configures the agricultural vehicle (1, 2) and associated agricultural equipment (102) to be used and can select other task-specific settings. This action creates an field specific configuration file that is saved to a database then used by a connected machine during autonomous navigation and operation to define parameters and behaviors of the machine such as max turning radius, path planning goals, headland turning styles, or equipment settings.

When the agricultural vehicle(s) (1, 2) and associated agricultural equipment (102) and the agricultural field and agricultural operation have been set up and saved the system (100) combines all of the saved data to generate an executable command(s) which is uploaded to the agricultural vehicle's (1, 2) executive controller unit (3, 9) and/or controlling computer or systems of computers and a series of checks and tests are completed to ensure functionality and safe operation. Once the appropriate executable commands are received, the executive controller unit (3, 9) and/or controlling computer actives the controllers and waits for a launch command. The user must then press a button to send a command. Any button push is registered by the client and passed to the sever which then submitted the message to a broker that directs the message over various open channels that the machine is listening to. Once the launch command is received, the executive controller unit (3, 9) and/or controlling computer executes the executable commands to control the agricultural vehicle (1, 2).

This system (100) as a whole serves as an interface for humans with unmanned agricultural vehicles (1, 2) and associated agricultural equipment (102). The system (1) configures and communicates with all of the components needed to control the agriculture vehicles (1, 2) and generates a variety of executable commands to allow the user in collaboration with the software of the system (100) to set up, send and monitor the execution of a variety of advanced agricultural in-field objectives.

The system (100) may be controlled through a user mobile device (11) such as a laptop or tablet which serves as the interaction point for users. Software applications running on the computer or user mobile device (11) allow access to and interaction with software and/or a program running locally on the computer or user mobile device (11) or on a cloud based server application (13). The software program is in wireless communication with a controller (such as executive controller unit (3, 9) and/or a controlling computer) on agricultural vehicle (1, 2). The executive controller unit (3, 9) and/or a controlling computer is connected to actuators and/or electronic driven machine control devices (such as electronic steering controller (5) and electronic speed controller (6) and the like). The system (100) takes settings and information entered by the user to define a number of settings that control how vehicle controller (such as executive controller unit (3, 9) and/or a controlling computer) will manipulate the connected vehicle controls to complete any given command. Once the settings for command execution have been defined the system (100) loads geographical data or allows the user to create such data. The system (100) then gathers position data from the vehicle controller (such as executive controller unit (3, 9) and/or a controlling computer).

Next, the system (100) allows the user to define an objective or plan an operation they desire the agricultural vehicle (1, 2) to perform by selecting from a predefined list of agricultural operations. Each option contains a command structuring protocol for defining the basic nature of machine travel patterns, metrics and behaviors. This protocol is then used in conjunction with geographical data, machine state, machine position, machine limits, machine type, equipment type and other known information and/or user defined requirements to generate an executable command or command chain. After the vehicle controller (such as executive controller unit (3, 9) and/or a controlling computer) is sent the command or chain of commands it runs a process to sequentially execute them after completing a variety of systems checks. Once the vehicle controller (such as executive controller unit (3, 9) and/or a controlling computer) begins generating the outputs to the electronic vehicle controls and the controls respond in the appropriate manner the agricultural vehicle (1, 2) is made to move. As the agricultural vehicle (1, 2) moves and the controller (such as executive controller unit (3, 9) and/or a controlling computer) executes a command and whenever it is activated it transmits position data, state data, sensor data, and any other useful data it is capable of transmitting wirelessly through local mesh network (15) and/or local Wi-Fi connection (16) and/or cellular network (17).

This transmitted data is then received by the system (100) through cloud service provider (14) by cloud based server application (13), analyzed and displayed in real-time or near real time to the user through user mobile device (11).

The system (100) logs data and is capable of displaying it on a map interface that allows the user to monitor progress of the agricultural vehicle(s) (1, 2) and associated agricultural equipment (102) while the system (100) executes commands. Serving as a monitoring station, the system (100) flags events and asks for user input in situations where clear protocols are not defined such as an unknown obstacle in its path or any other aberration or unanticipated event. Using its analytics process the system (100) logs user reactions to events, categorizes them, stores them and uses this information to optimize the default operation protocols so as to know how to handle these events in the future and/or to altogether avoid these events in the future and to reduce the number of flagged events in the future thereby improving the safety and efficiency of operation.

The system, (100) also provides a method for a user to control and monitor multiple agricultural vehicle(s) (1, 2) and associated agricultural equipment (102) simultaneously and define interaction protocols for these agricultural vehicle(s) (1, 2) and associated agricultural equipment (102). The system (100) allows a user to define operations and output commands to multiple autonomous agricultural vehicle(s) (1, 2) and associated agricultural equipment (102) or a combination of manned and unmanned agricultural vehicle(s) (1, 2) and associated agricultural equipment (102). For example, if a user wishes to drive one agricultural vehicle (1, 2) with associated agricultural equipment (102) and use the system (1)) to control an unmanned agricultural vehicle (1, 2) and associated agricultural equipment (102) in the same field the system (100) allows for both agricultural vehicles (1, 2) and associated agricultural equipment (102) to be monitored and gives the user the ability to define a command chain which allows the unmanned agricultural vehicle (1, 2) and associated agricultural equipment (102) to follow or work beside the manned agricultural vehicle (1, 2) and associated agricultural equipment (102). The system (100) provides this functionality by connecting to and receiving data from both agricultural vehicles (1, 2) and associated agricultural equipment (102) simultaneously then outputting continually updated command chains to the unmanned agricultural vehicles (1, 2) and associated agricultural equipment (102) based on the manned agricultural vehicle's (1, 2) position, speed, and a variety of other settings. The advantage of this type of operation is that a user can direct an unmanned agricultural vehicle (1, 2) and associated agricultural equipment (102) to clone settings defined from the cab of the agricultural vehicle(s) (1, 2) and associated agricultural equipment (102) operated by the operator without the need to physically input this information into the unmanned machine.

To facilitate this functionality, system (100) includes software engineering and hardware configurations facilitate the crafting of a cloud based server application (13) using a server based publish subscribe protocol and associated messaging protocols and brokers which are capable of cloud or wireless based communication with an on-board vehicle controller (such as executive controller unit (3, 9) and/or a controlling computer). The system (100) also includes tools within a software application or browser based client to define settings and design operation protocols into a single useful cloud based server application (13) which provides the user with an easy way to configure, monitor and control unmanned agriculture vehicles (1, 2) and associated agricultural equipment (102).

In an alternative arrangement, the system (100) presented herein may be used to monitor, but not necessarily control, agriculture vehicles (1, 2) and associated agricultural equipment (102) by removing the control protocols on from the system (100). In doing so, the user may still find the system (100) is useful for monitoring a manned machine to log and view, machine position, speed, engine settings, operation progress and a variety of other data which can be gathered by connecting the necessary components to an agriculture vehicles (1, 2) and associated agricultural equipment (102). This information may be used in later years/operations for autonomous operation when full autonomous control systems are provided and/or enabled on the agriculture vehicles (1, 2) and associated agricultural equipment (102).

Furthermore, the cloud based server application (13) is designed to work with at least limited functionality if not full functionality in an environment where internet connectivity is limited or non-existing. By switching from the cloud based server and/or application to a locally hosted server and/or application and connecting through a local wireless signal to agriculture vehicles (1, 2) and associated agricultural equipment (102) a user can control and monitor an unmanned agriculture vehicle (1, 2) and associated agricultural equipment (102) within operable proximity of the local wireless signal.

To enhance the usefulness of the system (100) a variety of sub processes may be designed and connected to the system (100) via the cloud based server application (13) and/or cloud based service provider (14). As an example, applications which can store and analyze agronomic data (such as yield, moisture content, weight, density, location, etc.) can be configured to receive data from the agriculture vehicle (1, 2) and associated agricultural equipment (102) being used to create as-applied or yield maps which would allow the user to analyze a crop throughout growing seasons. The previous is just one example of an enhancement that can be added to the system (100) and it is conceivable that the addition of new sensors (104) to the vehicle's on-board computer can also enhance the system (100). For example, adding sensors (104) to collect data about crop health, that data could be utilized by the disclosure to update command chains to a machine in near real time and control the rate of pesticide, herbicide, fungicide, or fertilizer application.

Once an agriculture vehicle (1, 2) and associated agricultural equipment (102) is configured with the needed control systems for autonomy the system (100) allows a user to begin configuration of that machine, the operations they wish it to complete, the location of those operations, and the equipment to be used in an operation. The user first establishes a connection to the agricultural vehicle's (1, 2) computer (such as executive controller unit (3, 9) and/or a controlling computer). This can be done by directing the system (100) to identify a machine heartbeat, which consists of a unique machine identification (ID) code or number. If an ID is located a user can request a connection to the agriculture vehicle (1, 2).

Following a connection, a user can input information about the agriculture vehicle's (1, 2) properties to the machine ECU (such as executive controller unit (3, 9) and/or a controlling computer). This information controls the basic behavior of a agricultural vehicle (1, 2) in terms of steering, speed, and dimensions. These setting are then stored on the agricultural vehicle's (1, 2) computer (such as executive controller unit (3, 9) and/or a controlling computer) and on the cloud based server application (13). Next a user configures the location properties of where the agricultural vehicle (1, 2) and associated agricultural equipment (102) will operate. This can be done by using a mapping interface and mapping function of the system (100) to locate the desired agricultural field and area and create outer and inner boundaries. The boundaries are then saved as strings of coordinates which creates virtual polygons that the system (100) is programmed to avoid.

The user also specifies protocols for the agricultural vehicle (1, 2) and associated agricultural equipment (102) to follow within the boundaries. The cloud based software server application (13) uses the previously defined settings to display a projected pattern of travel over the area defined. This pattern allows the user to visualize the path the agricultural vehicle (1, 2) and associated agricultural equipment (102) will follow to cover an agricultural field or to navigate throughout it. Before committing the agricultural operation plan the user can select and modify various sections of the projected path or routes to manipulate the course of vehicle as desired to match their preferences.

Furthermore, while setting up the agricultural operation, the user can define a number of variables based on coordinates or phase of operation. For example, when designing a tillage operation, the user can define areas of the route to increase or decrease depth or speed of the tillage operation. As another example, when designing a planting operation, the user can load a field prescription file to overlay rate or population settings to increase or decrease or otherwise modifying planting or spraying operation. Once the user has used the system (100) to set up an agricultural operation they are then able commit it to an activated agricultural vehicle (1, 2) and associated agricultural equipment (102) for execution. As the agricultural vehicle (1, 2) and associated agricultural equipment (102) is executing the agricultural operation the cloud based server application (13) provides a visual display of the agricultural vehicle (1, 2) and associated agricultural equipment (102) position on a map while also monitoring and displaying engine information, speed, heading, and a variety of other useful information. While an agricultural vehicle (1, 2) and associated agricultural equipment (102) is actively executing an agricultural operation it may request user directives to overcome unrecognized situations like an obstacle or discrepancy in actual verses commanded results.

Additionally the system (100) allows the user to make changes to the operation settings while an active agricultural operation is underway. For example, when an agricultural operation is to control a grain cart the user may wish to increase or decrease speed of the tractor (agricultural vehicle (1)) relative to a combine (agricultural vehicle (2)). By providing an interface which allows the user to adjust such settings on the go the system (100) serves as a remote control for the connected machine.

One Exemplary Embodiment

An example of how the system (100) is used for autonomous tillage is as follows. After the appropriate hardware (e.g. ECU (3) and/or ECU (9), navigational sensors (4), electronic steering control (5), electronic speed control (6), local user interface (7), user mobile device (8), vehicle telematics unit (9), and the like) has been installed on the agricultural vehicle (1, 2), from a user mobile device (11), such as a laptop connected to the on-board computer (such as executive controller unit (3, 9) and/or a controlling computer) a user will navigate to the machine configuration tool in the cloud based server application (13). The user will be asked to choose the type of machine which will be used, which is in this case a John Deere 9620R 4WD standard steering tractor. The user will then be asked to input information about the machine such as length, width, GPS position, top speed, etc.

Once the machine settings are in place the user will be asked to conduct an in-field calibration of the agricultural vehicle (1, 2) and associated agricultural equipment (102). To run the calibration, the user will manually train the on-board computer (such as executive controller unit (3, 9) and/or a controlling computer) to the machine limits. This will require several turns and accelerations with no associated agricultural equipment (102) attached to configure the on board computer (such as executive controller unit (3, 9) and/or a controlling computer). Once the machine set up is complete, the user names it and saves the settings for future use.

Next the user will set up and configure the agricultural equipment (102) associated with the agricultural vehicle (1, 2), which in this case is tillage implement attached to the agricultural vehicle (1, 2). Again the user selects the agricultural equipment (102) in the cloud based server application (13), inputs dimensions, and conducts an infield calibration of limits just as turning radius, speeds, and depth settings. Once the settings are defined the settings are saved for future use.

By defining and calibrating the agricultural vehicle (1, 2) and associated agricultural equipment (102) together the system (100) creates a machine-equipment pair which is able to be used in agricultural operations.

Next, the user sets up an agricultural field or fields using the cloud based server application (13). By navigating to the field creator tool and uploading stored field files the user defines the outer and inner boundaries for the agricultural vehicle (1, 2) and associated agricultural equipment (102) or alternatively a user can, through the cloud based server application's (13) map interface, draw boundaries around a field and inside of it. A third option for boundary creation is for a user to drive a connected machine (such as a truck or utility vehicle with a connected GPS system) physically around the field boundaries and record them. Once the field boundaries have been defined they are saved and stored for future use.

Next the user navigates to the operation set up tool and adds the general settings for the tillage operation. The user will be asked, for example, to define a target depth, speed, overlap, and turning protocol. These settings are stored and saved for future use in the cloud based server application (13) and associated cloud based database (12).

The next step is for the user to select the field, machine, equipment and operation combination they wish to perform. Once these variables are selected the system (100) compiles all of the settings for each saved element and generates an executable file or command chain based on the default or saved settings. At this point the application displays the projected operation onto the field chosen in a map interface along with a variety of viewable settings which can be changed based on the user preference. This gives the user the ability to make some if not all field-specific changes to the previously defined settings before launching the agricultural operation. Adjustments may include settings like speed, direction of travel, turning areas, depth, seed density, application rate of fertilizer, or the like.

Once the user is satisfied with the set agricultural operation the user submits the operation to the agricultural vehicle (1, 2) and associated agricultural equipment (102) for execution and enters a monitoring mode. In the monitoring mode the user is able to view the map interface and track the progress and performance of the agricultural vehicle (1, 2) and associated agricultural equipment (102) while having the ability to adjust settings on the go, start/stop the agricultural operation, and receive notifications of problems the agricultural vehicle (1, 2) and associated agricultural equipment (102) encounters.

The above is example meant to describe and show, use of the system (100) to conduct one type of agricultural operation and is not meant to limit the scope of the system (100) to only tillage or the exact process as defined above.

Figure 9:
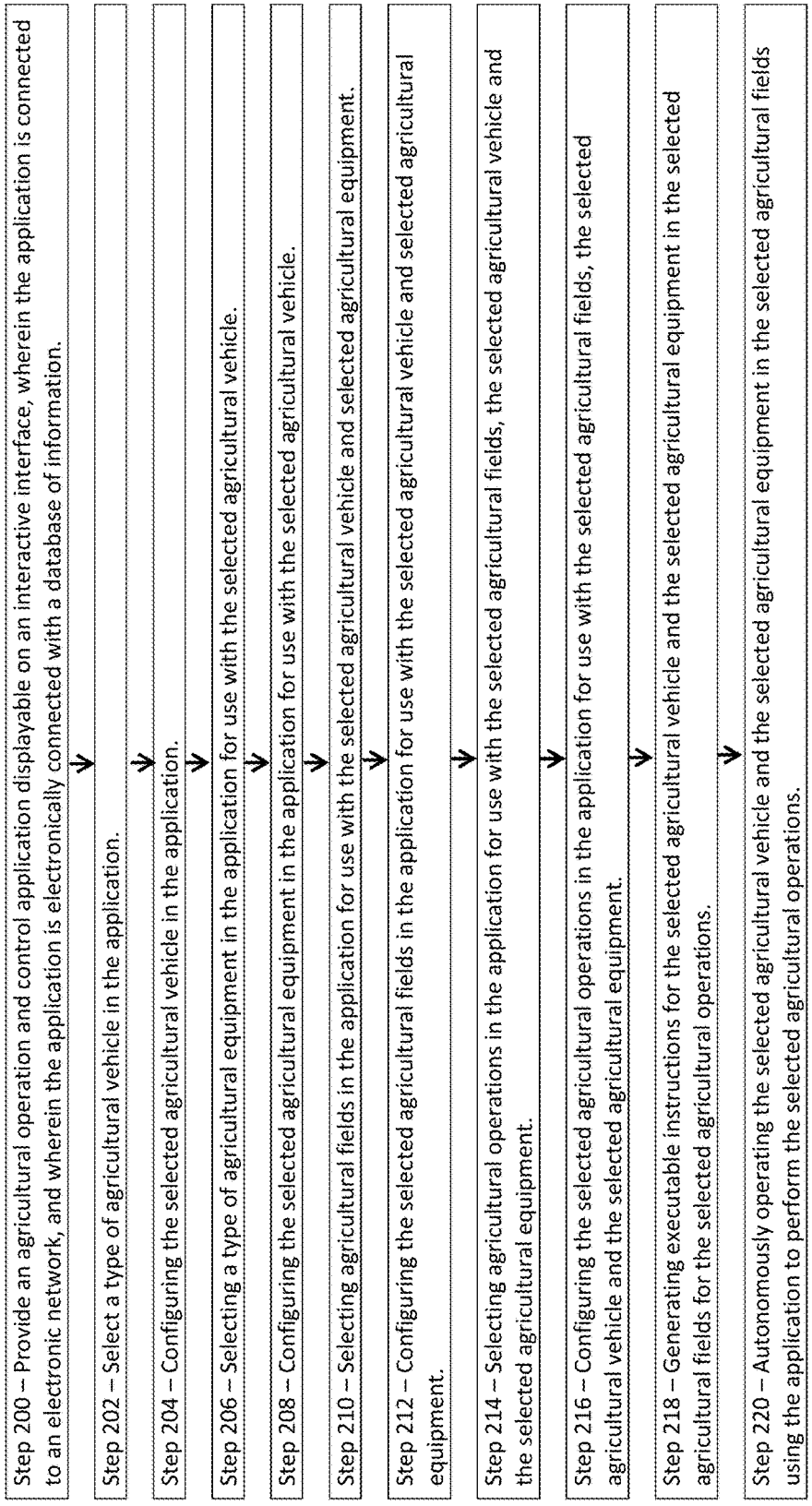
FIG. 9. is a plan view of a flowchart of one example of the method of operation of the agricultural operation and control application presented herein.

With reference to FIG. 9, another example of operation of the systems (100) is presented.

At step 200, an agricultural operation and control application displayable on an interactive interface is provided, wherein the application is connected to an electronic network, and wherein the application is electronically connected with a database of information.

At step 202, the type of agricultural vehicle used is selected in the application.

At step 204, the selected agricultural vehicle is configured in the application.

At step 206, the type of agricultural equipment is selected in the application for use with the selected agricultural vehicle.

At step 208, the selected agricultural equipment is configured in the application for use with the selected agricultural vehicle.

At step 210, the agricultural fields are selected in the application for use with the selected agricultural vehicle and selected agricultural equipment At step 212, the selected agricultural fields are configured in the application for use with the selected agricultural vehicle and selected agricultural equipment.

At step 214, agricultural operations are selected in the application for use with the selected agricultural fields, the selected agricultural vehicle and the selected agricultural equipment At step 216, the selected agricultural operations are configured in the application for use with the selected agricultural fields, the selected agricultural vehicle and the selected agricultural equipment.

At step 218, executable instructions are generated for the selected agricultural vehicle and the selected agricultural equipment in the selected agricultural fields for the selected agricultural operations by the agricultural operation and control application.

At step 220, autonomously operating the selected agricultural vehicle and the selected agricultural equipment in the selected agricultural fields using the application to perform the selected agricultural operations Other steps may include, performing an in-field calibration of the selected agricultural vehicle; performing an in-field calibration of the selected agricultural equipment; performing an in-field calibration of the selected agricultural vehicle without the selected agricultural equipment followed by performing an in-field calibration of the selected agricultural vehicle with the selected agricultural equipment attached to the selected agricultural vehicle; providing a field creator tool in the application that provides a visual display of a selected field and displays boundaries and information about the agricultural operation on the visual display of the field; optimizing operation of the selected agricultural vehicle and the selected agricultural equipment in the selected agricultural field using the application; recording information during autonomous operation and storing this information in the database; installing hardware on the selected agricultural vehicle, wherein the hardware facilitates autonomous control of the selected agricultural vehicle and the selected agricultural equipment; installing sensors (104) on the selected agricultural vehicle, wherein the sensors (104) facilitates autonomous control of the selected agricultural vehicle and the selected agricultural equipment; and providing a mapping function in the application and mapping a course for the selected agricultural vehicle and the selected agricultural equipment through the selected agricultural field, among other steps.

Further details and examples of these methods and/or steps are shown in FIGS. 2-7, which show flow charts of manners of operation of the system (100).

Example of Operation:

As one example of the manner in which system (100) operates, first agricultural vehicle (1) includes an executive controller unit (3) as well as includes a communications module (106) that facilitates wireless communications with second agricultural vehicle (2) as well as with the cloud based server application (13) simultaneously over a first network, a second network and a third network, or more. Similarly, in this example, second agricultural vehicle (2) includes an executive controller unit (9) as well as includes a communications module (106) that facilitates wireless communications with first agricultural vehicle (1) as well as with the cloud based server application (13) simultaneously over a first network, a second network and a third network, or more. In one arrangement, communications module (106) may be a single unit or a plurality of separate but connected units that may be formed as part of executive controller unit (3, 9) or in another arrangement may be separate but operatively connected to executive controller unit (3, 9).

Communications module (106) is formed of any suitable size, shape and design and is configured to provide wireless communications capabilities. In one arrangement, as is shown, to provide robust operation, communications module (106) provides communication simultaneously over a plurality of networks. That is, communications module (106) provides communications capabilities over a plurality of different paths or networks that provide redundant or duplicative connectivity. In doing so, when one network is not connected or connecting to the internet or to other connection points in the system (100) (such as the other agricultural vehicle (1 or 2)) the system (100) can continue to operate through the other networks that are connected or connecting. In one arrangement, as is shown, communications module (106) provides simultaneous wireless communication over a first network, a second network and a third network, however any number of networks may be used, such as four, five, six, seven, eight, nine, ten or more is hereby contemplated for use used.

In one arrangement, when, for example, three networks are used, the first network and the second network are local networks whereas the third network is an external network. In one arrangement, a local network is a wireless network that covers a limited geographic area. Examples of local networks include Wi-Fi, Bluetooth, or many mesh network protocols, and the like. In contrast, in one arrangement, an external network is a wireless network that covers a more-expansive geographic area than a local network. Examples of external networks include the use of cellular communication (similar or identical to that used by cellular phones) satellite communication (similar or identical to that used by satellite phones), and the like.

In one arrangement, when system (100) utilizes three networks, and the first network and the second network are local networks and the third network is an external network. In this arrangement the first network uses a first communication protocol on a first frequency or wavelength or spectrum of wireless communication (such as Wi-Fi, e.g. local WI-FI connection (16)), second network uses a second communication protocol on a second frequency or wavelength or spectrum of wireless communication (such as a mesh network such as, for example, ZigBee, Z-Wave, EnOcean, synapse network appliance protocol (SNAP), Bluetooth, and the like, e.g. local mesh network (15)), and the third network uses a third communication protocol on a third frequency or wavelength or spectrum of wireless communication (such as cellular communication, e.g. cell connection (10)). Using three different networks with three different protocols operating on three different wavelengths provides increased robustness to the system (100) as one network may perform better than the other networks in different situations and environments and circumstances. In an alternative arrangement the first network, the second network and the third network use the same protocol, while using different frequencies and/or wavelengths for wireless communication.

In this arrangement, first agricultural vehicle (1) and second agricultural vehicle (2) are capable of connecting to the internet through the communications module (106) over any of the first network, the second network or the third network. In the arrangement wherein the first network and the second network are local networks, communications module (106) connects to a locally-positioned gateway, node, switch, repeater, router, modem or the like that is connected with the internet thereby facilitating communication over the internet with cloud based server application (13). This locally-positioned gateway, node, switch, repeater, router, modem or the like operates on the same frequency and/or protocol as the first network and/or second network and is positioned within over-the-air communications distance thereby facilitating communication to the internet.

In the arrangement wherein the third network is an external network, communications module (106) connects to a cellular tower (10) or other cellular communication point such as gateway, switch, repeater, router, modem or the like that is connected with the internet thereby facilitating communications over the internet. This cellular tower (10) or other cellular communication point such as gateway, switch, repeater, router, modem or the like operates on the same frequency and/or protocol as the third network and is positioned within over-the-air communications distance thereby facilitating communication to the internet.

In this arrangement, server application (13) is installed on the cloud based server (14) as well as being installed on the executive controller unit (3, 9) of the first agricultural vehicle (1) and the second agricultural vehicle (2). When first agricultural vehicle (1) and second agricultural vehicle (2) are in wireless communication over the internet with server application (13) on cloud based server (14) the server application (13) on the executive controller (3, 9) of the first agricultural vehicle (1) and/or second agricultural vehicle (2) syncs or updates with the server application (13) on cloud based server (14). This exchange of information ensures that the server application (13) running on the cloud based server (14) and the server application (13) running on the executive controller units (3, 9) of the first agricultural vehicle (1) and the second agricultural vehicle (2) are congruent with one another.

In the arrangement presented, first agricultural vehicle (1) and second agricultural vehicle (2) wirelessly connect to one another in a number of ways.

As a first example, first agricultural vehicle (1) and second agricultural vehicle (2) connect directly to one another through wireless communications module (106) over the first network using the first protocol (such as Wi-Fi) and thereby exchange information directly with one another.

As a second example, first agricultural vehicle (1) and second agricultural vehicle (2) connect to one another through wireless communications module (106) over the first network using the first protocol (such as Wi-Fi) by connecting to a gateway, switch, repeater, router, modem or the like that is connected with the internet thereby facilitating communications between first agricultural vehicle (1) and second agricultural vehicle (2) over the internet using the first network.

As a third example, first agricultural vehicle (1) and second agricultural vehicle (2) connect directly to one another through wireless communications module (106) over the second network using the second protocol (such as a mesh network such as ZigBee, Z-Wave, EnOcean, synapse network appliance protocol (SNAP), Bluetooth, and the like) and thereby exchange information directly with one another.

As a fourth example, first agricultural vehicle (1) and second agricultural vehicle (2) connect to one another through wireless communications module (106) over the second network using the second protocol (such as a mesh network such as ZigBee, Z-Wave, EnOcean, synapse network appliance protocol (SNAP), Bluetooth, and the like) by connecting to a gateway, switch, repeater, router, modem or the like that is connected with the internet thereby facilitating communications between first agricultural vehicle (1) and second agricultural vehicle (2) over the internet using the second network.

As a fifth example, first agricultural vehicle (1) and second agricultural vehicle (2) connect to one another through wireless communications module (106) over the third network using the third protocol (such as cellular communication) by connecting to a cellular tower (10) or other cellular communication point such as gateway, switch, repeater, router, modem or the like operates on the same frequency and/or protocol as the third network and is positioned within over-the-air communications distance thereby facilitating communications between first agricultural vehicle (1) and second agricultural vehicle (2) over the internet using the first network.

In practice, especially in remote and/or rural areas, it has been found that connecting to the internet can be challenging and an internet connection is often lost during operation. When connection to the internet is lost, and thereby connection to the server application (13) running on cloud based server (14) is lost, the first agricultural vehicle (1) and/or the second agricultural vehicle (2) are capable of continued autonomous operation by exchanging information directly with one another through direct wireless communication over the first network and/or second wireless network based on the last update of information from the server application (13) on the cloud based server (14).

As an example, when connection to the internet is lost, first agricultural vehicle (1) and/or second agricultural vehicle (2) continue to exchange information directly with one another through communications module (106) over the first network and/or the second network. In doing so, the first agricultural vehicle (1) and second agricultural vehicle (2) keep each other apprised of their position, speed, direction, yaw, and any other information gathered or sensed by the agricultural vehicle during operation. This information is supplied to and processed by the server application (13) that is running on the executive controller unit (3, 9) of the first agricultural vehicle (1) and second agricultural vehicle (2) thereby allowing the continued autonomous operation of the system (100) despite lack of internet connectivity. This direct wireless communication between first agricultural vehicle (1) and second agricultural vehicle (2) ensures that the two vehicles are aware of each other's position and progress and ensures an adequate level of safety while maximizing productivity and minimizing down time. This continued autonomous operation when a connection to the internet is lost occurs based on the last set of information and instructions and information provided by the server application (13) running on the cloud based server (14).

When internet connectivity is reestablished, the server application (13) running on the executive controller unit (3, 9) of the first agricultural vehicle (1) and second agricultural vehicle (2) syncs and updates with the instructions and information on the server application (13) running on the cloud based server (14). This arrangement allows the autonomous operation of the first agricultural vehicle (1) and second agricultural vehicle (2) when the connection to the internet is lost. This arrangement also allows for the server application (13) running on the executive controller unit (3, 9) of the first agricultural vehicle (1) and second agricultural vehicle (2) to update as soon as a connection to the internet is reestablished. While a connection to the internet through communications module (106) is needed at some point in time to install the server application (13) on the executive controller unit (3, 9) on the first agricultural vehicle (1) and second agricultural vehicle (2) and/or to transfer the information and instructions in the server application (13) running on the cloud based server (14) onto the executive controller unit (3, 9) on the first agricultural vehicle (1) and second agricultural vehicle (2), once installed the first agricultural vehicle (1) and second agricultural vehicle (2) are capable of autonomous operation based on the information and instructions exchanged during the last sync with the server application (13) running on the cloud based server (14).

In one manner of speaking, the server application (13) running on the cloud based server (14) is the master and the server application (13) installed and running on the executive controller units (3, 9) of the first agricultural vehicle (1) and second agricultural vehicle (2) are the slaves. When an internet connection is reestablished between the server application (13) running on the cloud based server (14) and the server application (13) installed and running on the executive controller units (3, 9) of the first agricultural vehicle (1) and second agricultural vehicle (2), the server application (13) installed and running on the executive controller units (3, 9) of the first agricultural vehicle (1) and second agricultural vehicle (2) updates with whatever new or additional information or instructions contained in the server application (13) running on the cloud based server (14).

When all communication is lost between the first agricultural vehicle (1) and second agricultural vehicle (2) (e.g. over all three networks), as a safety precaution, the system (100) is programmed to stop the autonomous control of the first agricultural vehicle (1) and/or second agricultural vehicle (2). This is due, in part, because the first agricultural vehicle (1) and second agricultural vehicle (2) are not apprised of one another's position, progress, and other information if they are not able to communicate with one another. When communication is reestablished between the first agricultural vehicle (1) and second agricultural vehicle (2) over at least one of the networks, and no fault conditions or other reasons for not resuming autonomous operation are present, then autonomous operation resumes.

In one arrangement, first agricultural vehicle (1) and second agricultural vehicle (2) are considered in communication with one another, and autonomous operation is allowed to continue, when they are in communication with an intermediary device, such as a user mobile device (11), such as a user's tablet, laptop, smart phone or the like. In one arrangement, first agricultural vehicle (1) and second agricultural vehicle (2) are considered in communication with one another, and autonomous operation is allowed to continue, when they are in communication with the internet.

In another arrangement, the first agricultural vehicle (1) and second agricultural vehicle (2) are capable of continuous autonomous operation when communication is lost between the first agricultural vehicle (1) and second agricultural vehicle (2) and the internet as well as with one another. In this arrangement, the autonomous operation of the first agricultural vehicle (1) and second agricultural vehicle (2) is controlled by the server application (13) that is running on the executive controller unit (3, 9) of the first agricultural vehicle (1) and second agricultural vehicle (2) and the first agricultural vehicle (1) and second agricultural vehicle (2) rely upon their navigational sensors (4) and other sensors (104) such as proximity sensors, cameras, radar, sonar, and collision sensors, and the like, to detect the presence of the other agricultural vehicle (1, 2) as well as other obstacles. In this arrangement, system (100) provides autonomous operation of one or both agricultural vehicles (1, 2) despite lack of internet connectivity and despite the lack of connectivity between the first agricultural vehicle (1) and second agricultural vehicle (2).

Another Example of Operation:

As another example of the manner in which system (100) operates, first agricultural vehicle (1) includes an executive controller unit (3) as well as includes a communications module (106) that facilitates wireless communications with a user mobile device (11) having a display, the user mobile device (11) positioned external to the first agricultural vehicle (1). In one manner of speaking, the in this example, the user mobile device (11) replaces or takes the place or is similarly situated as is the second agricultural vehicle (2) in the example of operation presented above, and the user mobile device (11) performs many of the same functions as the second agricultural vehicle (2) presented above and therefore the teaching presented therein is applied to the user mobile device (11) presented in this example.

User mobile device (11) is formed of any suitable size, shape and design and facilitates the operation of server application (13) on the mobile device (11) remote from the first agricultural vehicle (1). User mobile device (11) is any electronic device that includes a display and is capable of running server application (13) as well as wirelessly communicating with the first agricultural vehicle (1), the internet, as well as other components of the system (100). As examples, user mobile device (11) may be a laptop computer, a desktop computer, a smart phone, a tablet, or any other computing device. The user mobile device (11) is capable of sending and receiving information as well as displaying information to the use.

As further information, first agricultural vehicle (1) and user mobile device (11) wirelessly communicate with one another over any one or all of the networks described herein, including the first network, the second network, and the third network, wherein the first network is a local network (such as Wi-Fi or the like), wherein the second network is a local network (such as a mesh network, or the like), and the third network is an external network (such as cellular or satellite communication, or the like) as is described further herein.

Like the example above, this multi-path communication provides robustness and redundancy by facilitating communication over multiple wavelengths, using multiple protocols, each with their own strengths and weaknesses.

In this arrangement, the server application (13) is installed on the cloud based server (14) as well as on the executive controller (3) of the first agricultural vehicle (1) as well as on the user mobile device (11). As such, the server application (13) simultaneously runs on the first agricultural vehicle (1), the cloud based server (13) and the user mobile device (11).

The first agricultural vehicle (1) establishes a wireless connection with the server application (13) on the cloud based server (14) and exchanges information there with. Similarly, the user mobile device (11) establishes a wireless connection with the server application (13) on the cloud based server (14) and exchanges information there with. In doing so, the user mobile device (11) and the first agricultural vehicle (1) are capable of wireless communication with one another through the internet either by way of connection to the server application (13) on the cloud based server (14) or directly to one another through their internet connection. In addition, in one arrangement, the user mobile device (11) and the first agricultural vehicle (1) are capable of direct wireless communication with one another through direct wireless communication without going through the internet. This arrangement facilitates communication when an internet connection is available or consistent. This direct wireless communication may be facilitated, as examples, through the first wireless network and/or the second wireless network which are local network (such as Wi-Fi or a mesh network, or the like).

Control Through Internet:

In one arrangement, when control is facilitated through a wireless connection to the internet, the first agricultural vehicle (1) wirelessly connects to the internet through its communication module (106). In doing so, first agricultural vehicle (1) communicates with the server application (13) on the cloud based server (14) and exchanges information therewith. Similarly, user mobile device (11) wirelessly connects to the internet through its communication module (106). In doing so, user mobile device (11) communicates with the server application (13) on the cloud based server (14) and exchanges information therewith. In this arrangement, the server application (13) on the cloud based server (14) operates as the master. Meaning it receives information from both the user mobile device (11) and the first agricultural vehicle (1) and stores it. Information received from one of the user mobile device (11) and the first agricultural vehicle (1) is sent to the other of the user mobile device (11) and the first agricultural vehicle (1). Also, as information changes, the server application (13) on the cloud based server (14) distributes this changed information to the user mobile device (11) and the first agricultural vehicle (1). As such, in this arrangement, the server application (13) on the cloud based server (14) acts as a central repository for information as well as a communications hub, or pass-through point, thereby facilitating operation of the system (100).

Another feature of this arrangement is that the current information of the first agricultural vehicle (1) (and for that matter all the other agricultural vehicles that are operating as part of the system (100) as this system is not limited to just the operation of a single agricultural vehicle and instead is applicable to any number of agricultural vehicles) is displayed in real-time or in near real time on the display of the user mobile device (11) to the user. This information includes the position of the first agricultural vehicle (1) displayed on a map or image of the agricultural field as well as the present and future path of the agricultural vehicle (1) as well as the speed, pitch, yaw, direction, RPMs, fuel level, engine temperature, and any other applicable information sensed by the agricultural vehicle (1).

In standard operation, the first agricultural vehicle (1) executes the instructions stored in the server application (13) and the present status and information is displayed to the user. When the user desires to modify the operation of the first agricultural vehicle (1) the user interacts with the interactive display of the user mobile device (11) which may be a touch screen, or a graphical user interface (GUI) that is controllable by way of a mouse, keyboard or any other control mechanism. When the user changes the commands or instructions on the server application (13) on the user mobile device (11) this information is transmitted to the server application (13) on the cloud based server (14). This changed information is then transmitted by the server application (13) on the cloud based server (14) to the server application (13) operating on the executive controller unit (3) of the first agricultural vehicle (1) through communications module (106). Upon reception of these changed commands or instructions, the server application (13) operating on the executive controller unit (3) of the first agricultural vehicle (1) changes the operation of the first agricultural vehicle (1).

In this way, the system (100) facilities remote user review of the current status of operation of the first agricultural vehicle (1) as well as allowing the user to remotely control and/or change the autonomous operation of the first agricultural vehicle (1) through the use of remote user mobile device (11) through the use of internet connection.

Control Through Direct Connection:

While the system (100) facilitates control through the user mobile device (11) through connection to the internet, as is described above, the system (100) also facilitates control through the user mobile device (11) through direct wireless communication between the user mobile device (11) and the first agricultural vehicle (1). This direct wireless communication between user mobile device (11) and the first agricultural vehicle (1) is beneficial as it eliminates the need for an internet connection, which is often problematic in remote areas.

In this arrangement, when the user modifies or changes the commands or instructions on the server application (13) on the user mobile device (11) this information is transmitted directly (or in the example of a network or mesh network through one or more repeaters or nodes in the wireless network) to the cloud based server (14) to the server application (13) operating on the executive controller unit (3) of the first agricultural vehicle (1) through communications module (106). Upon reception of these changed commands or instructions, the server application (13) operating on the executive controller unit (3) of the first agricultural vehicle (1) changes the operation of the first agricultural vehicle (1).

In this way, the system (100) facilities remote user review of the current status of operation of the first agricultural vehicle (1) as well as allowing the user to remotely control and/or change the autonomous operation of the first agricultural vehicle (1) through the use of remote user mobile device (11) through the use of direct (or indirect in the case of a network or mesh network utilizing a plurality of nodes or repeaters) connection between the user mobile device (11) and the first agricultural vehicle (1) without connection to the internet. When a connection to the internet is reestablished, the server application (13) on the user mobile device (11) and the executive controller unit (3) of the first agricultural vehicle (1) sync or update with the server application (13) on the cloud based server (14).

Another Example of Operation:

As another example of the manner in which system (100) operates, first agricultural vehicle (1) includes an executive controller unit (3) as well as includes a communications module (106) that facilitates wireless communications with second agricultural vehicle (2) having a vehicle telematics unit (9). In this arrangement, a user pilots the second agricultural vehicle (2) and the first agricultural vehicle (1) mirrors or shadows the second agricultural vehicle (2) during a portion of its operation. This arrangement is particularly helpful in situations such as when the second agricultural vehicle (2) is a combine and the first agricultural vehicle (1) is a tractor pulling a wagon as the agricultural equipment (102). In this arrangement, when first agricultural vehicle (1) is shadowing the movements of the second agricultural vehicle (2) the first agricultural vehicle (1) is guided to remain at specified distance and position relative to the second agricultural vehicle (2) regardless of the direction and speed of operation of the second agricultural vehicle (2) (e.g. the wagon (agricultural equipment (102)) of the first agricultural vehicle (1) is positioned under an unload point of the second agricultural vehicle (2) such as the unload auger of a combine). Once the wagon (agricultural equipment (102)) is full, the system (100) is configured to stop shadowing the second agricultural vehicle (2) and drive the first agricultural vehicle (1) to an offload point, wherein the wagon is unloaded. This arrangement allows the user to essentially operate two separate agricultural vehicles (1, 2) through the use of system (100).

It will be appreciated by those skilled in the art that other various modifications could be made to the device without parting from the spirit and scope of this disclosure. All such modifications and changes fall within the scope of the claims and are intended to be covered thereby.

What is claimed:

1. A method for the autonomous control of one or more agricultural vehicles comprising:
    selecting autonomy inputs for at least one agricultural operation, wherein selecting autonomy inputs includes:
    selecting the agricultural operation;
    selecting at least one agricultural vehicle for conducting the agricultural operation; and
    selecting at least one field for conducting the agricultural operation;
    compiling the selected autonomy inputs as a configuration profile for the agricultural operation;
    generating an executable command chain for the selected agricultural operation based on the configuration profile of selected autonomy inputs; and
    implementing the executable command chain with the at least one agricultural vehicle to autonomously conduct the agricultural operation in the at least one field.

2. The method of claim 1, wherein generating the executable command chain includes remotely generating the executable command chain relative to the at least one agricultural vehicle with a remote application independent of the at least one agricultural vehicle.

3. The method of claim 2 comprising:
    receiving the executable command chain at the at least one agricultural vehicle; and
    wherein implementing the executable command chain includes independently implementing the executable command chain with the at least one agricultural vehicle relative to the remote application after reception of the executable command chain.

4. The method of claim 3 comprising:
modifying the executable command chain received at the at least one agricultural vehicle or an input interface with one or more modifications, wherein modifying is independent of the remote application; and
logging the one or more modifications with the remote application.

5. The method of claim 4, wherein the one or more modifications include user reactions to events including obstacles.

6. The method of claim 4 comprising incorporating the one or more modifications in generating a future executable command chain for the selected agricultural operation.

7. The method of claim 1, wherein implementing the executable command chain includes autonomously operating the at least one agricultural vehicle and associated agricultural equipment.

8. The method of claim 1, wherein selecting autonomy inputs includes:
selecting agricultural equipment for conducting the agricultural operation with the at least one agricultural vehicle.

9. The method of claim 1, wherein one or more of the agricultural operation, the at least one agricultural vehicle or the at least one field include operation configuration parameters, vehicle configuration parameters or field configuration parameters, respectively.

10. The method of claim 9, wherein the field configuration parameters include one or more of a shape file, coordinate based polygon file, geographical boundary, mapping function drawing, obstacle location, traffic area, traffic pattern or turning area.

11. The method of claim 9, wherein the vehicle configuration parameters include one or more of turning radius, vehicle dimensions, GPS position, maximum speed, steering performance or agricultural equipment settings.

12. The method of claim 9, wherein the operation configuration parameters include one or more of projected travel pattern, projected travel path, operation speed, target depth, overlap, tilling depth, planting depth, application rate, seed population density, sprayer flow rate, specified spacing between vehicles, specified position between vehicles or offloading location.

13. A system for the autonomous control of one or more agricultural vehicles comprising:
an input interface configured for selection of a plurality of autonomy inputs for at least one agricultural operation, wherein the plurality of autonomy inputs includes:
at least one agricultural operation;
at least one agricultural vehicle configured to conduct the agricultural operation;
at least one field for conducting the agricultural operation; and
wherein the plurality of autonomy inputs are compiled into a configuration profile for the agricultural operation; and
an executive controller unit configured for installation with the at least one agricultural vehicle, wherein the executive controller unit includes:
a communications module configured to receive an executable command chain generated for the agricultural operation based on the configuration profile of selected autonomy inputs; and
a vehicle controller configured to autonomously operate the at least one agricultural vehicle according to the received executable command chain.

14. The system of claim 13 comprising a mobile device having the input interface.

15. The system of claim 13 comprising a local user interface or field computer having the input interface.

16. The system of claim 13, wherein the executive controller unit includes a vehicle telematics unit.

17. The system of claim 13, wherein the executive controller unit is configured for installation in a plurality of agricultural vehicles.

18. The system of claim 13 comprising a remote application server configured to generate the executable command chain based on the configuration profile of selected autonomy inputs.

19. The system of claim 18, wherein the remote application server is independent from the executive controller unit, and the vehicle controller is configured to operate the at least one agricultural vehicle according to the received executable command chain independently from the remote application server after receipt of the received executable command chain.

20. The system of claim 18, wherein the executive controller unit is configured to log one or more modifications to the executable command chain at the at least one agricultural vehicle or the input interfaces and transmit the one or more modifications to the remote application server.

21. The system of claim 20, wherein the one or more modifications include user reactions to obstacles in the at least one field.

22. The system of claim 13, wherein the input interface is configured for selection agricultural equipment configured to conduct the agricultural operation.

23. The system of claim 13, wherein one or more of the at least one agricultural operation, the at least one agricultural vehicle or the at least one field include operation configuration parameters, vehicle configuration parameters or field configuration parameters, respectively.

24. The system of claim 23, wherein the field configuration parameters include one or more of a shape file, coordinate based polygon file, geographical boundary, mapping function drawing, obstacle location, traffic area, traffic pattern or turning area.

25. The system of claim 23, wherein the vehicle configuration parameters include one or more of turning radius, vehicle dimensions, GPS position, maximum speed, steering performance or agricultural equipment settings.

26. The system of claim 23, wherein the operation configuration parameters include one or more of projected travel pattern, projected travel path, operation speed, target depth, overlap, tilling depth, planting depth, application rate, seed population density, sprayer flow rate, specified spacing between vehicles, specified position between vehicles or offloading location.

* * * * *